(12) United States Patent
Orlando

(10) Patent No.: US 6,691,500 B2
(45) Date of Patent: *Feb. 17, 2004

(54) DIRECT DRIVE VIBRATORY SHAKER

(75) Inventor: Franklin P. Orlando, Morgan Hill, CA (US)

(73) Assignee: AG-Right Enterprises, Inc., Madera, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/145,946

(22) Filed: May 16, 2002

(65) Prior Publication Data

US 2002/0129593 A1 Sep. 19, 2002

Related U.S. Application Data

(63) Continuation of application No. 09/929,630, filed on Aug. 13, 2001, now Pat. No. 6,405,516, and a continuation of application No. 09/414,997, filed on Oct. 7, 1999, now abandoned.

(51) Int. Cl.⁷ ............................................... A01D 46/00
(52) U.S. Cl. ........................................ 56/328.1; 56/330
(58) Field of Search ................................ 56/330, 328.1, 56/327.1, 332, 333; 460/113, 135, 145, 126, 146, 147, 469, 150

(56) References Cited

U.S. PATENT DOCUMENTS

| | | | |
|---|---|---|---|
| 3,344,591 A | 10/1967 | Christie et al. | 56/330 |
| 3,413,789 A | 12/1968 | Studer | 56/330 |
| 3,494,117 A | 2/1970 | Weygandt et al. | 56/330 |
| 3,926,663 A | 12/1975 | Gray | 134/6 |
| 3,966,344 A | 6/1976 | Haker et al. | 404/117 |
| 4,007,053 A | 2/1977 | Gray | 134/6 |
| 4,077,193 A | 3/1978 | Diggs | 56/328.1 |
| 4,114,463 A * | 9/1978 | Garden et al. | 74/61 |
| 4,265,080 A * | 5/1981 | Goldsmith | 56/330 |
| 4,286,426 A * | 9/1981 | Orlando et al. | 56/330 |
| 4,329,836 A | 5/1982 | Scudder | 56/330 |
| 4,341,062 A | 7/1982 | Scudder | 56/330 |
| 4,418,521 A * | 12/1983 | Orlando et al. | 56/330 |
| 4,432,190 A | 2/1984 | Orlando | 56/1 |
| 4,974,405 A | 12/1990 | Littau | 56/330 |
| 5,113,644 A | 5/1992 | Windemuller et al. | 56/330 |
| 5,259,177 A | 11/1993 | Windemuller et al. | 56/330 |
| 5,339,612 A | 8/1994 | Scott | 56/330 |
| 5,355,667 A | 10/1994 | Scott | 56/330 |
| 5,423,166 A | 6/1995 | Scott | 56/330 |
| 5,813,910 A | 9/1998 | Meester et al. | 460/113 |
| 5,904,034 A | 5/1999 | Youman et al. | 56/328.1 |
| 5,908,352 A | 6/1999 | Meester et al. | 460/113 |
| 6,178,730 B1 * | 1/2001 | Visser | 56/327.1 |
| 6,360,518 B1 * | 3/2002 | Scott et al. | 180/435 |

* cited by examiner

*Primary Examiner*—Árpád F Kovács
(74) *Attorney, Agent, or Firm*—Douglas W. Rudy; Henry M. Stanley

(57) ABSTRACT

A vibratory shaker for mounting on a crop harvester framework for removing crops from vines, bushes, and trees has a crop foliage engaging brush that is driven directly about a brush rotation axis by a brush driving motor. The crop foliage engaging brush and the brush driving motor are supported for rotation on the crop harvester framework. The power for driving the brush driving motor is controlled to provide oscillatory motion subject to operator controlled frequency, amplitude and oscillatory wave shape.

7 Claims, 2 Drawing Sheets

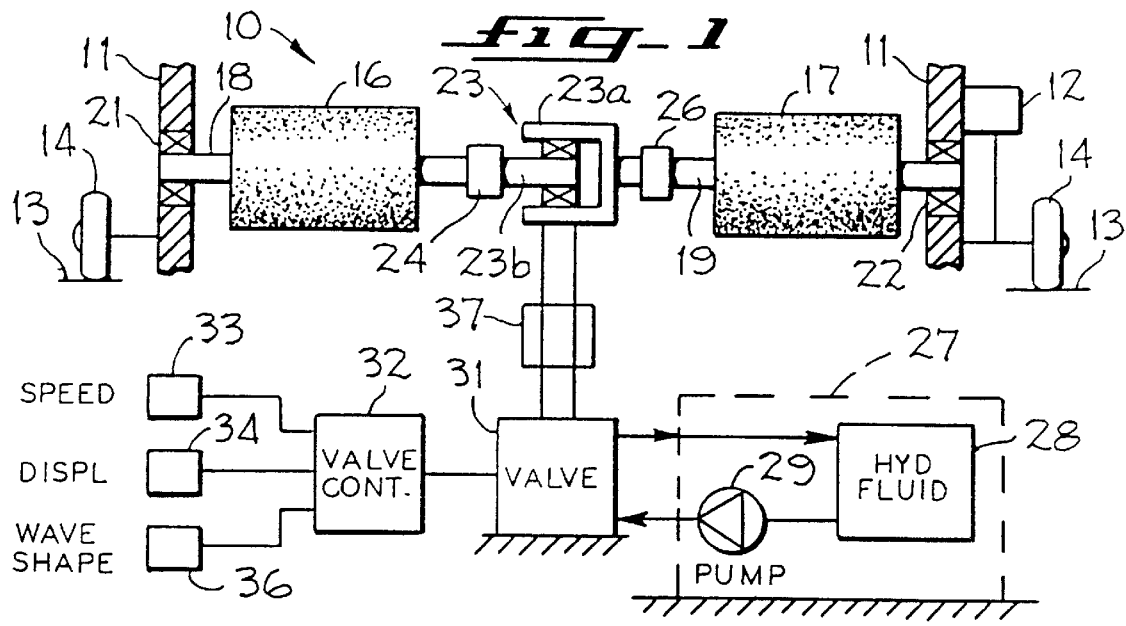
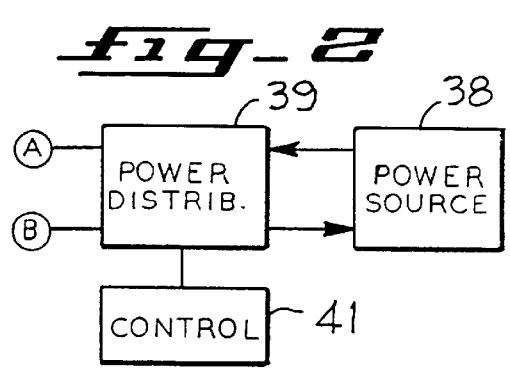
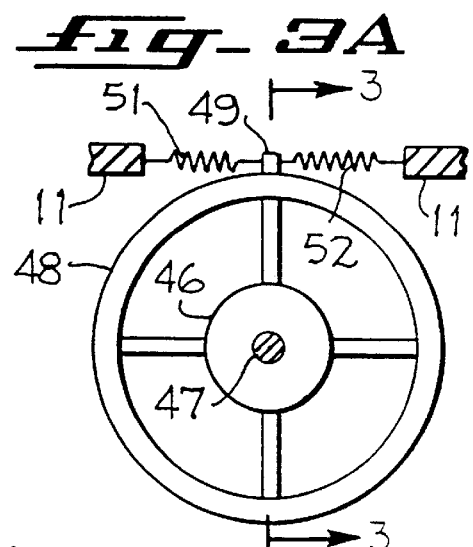
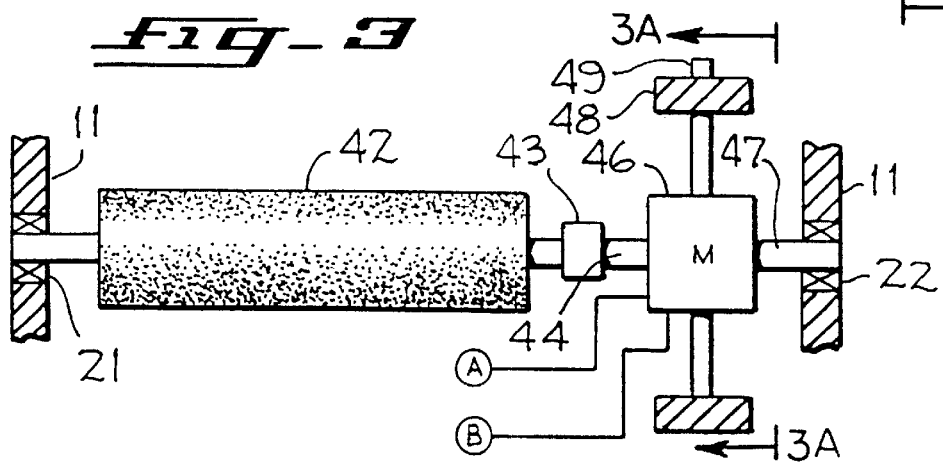

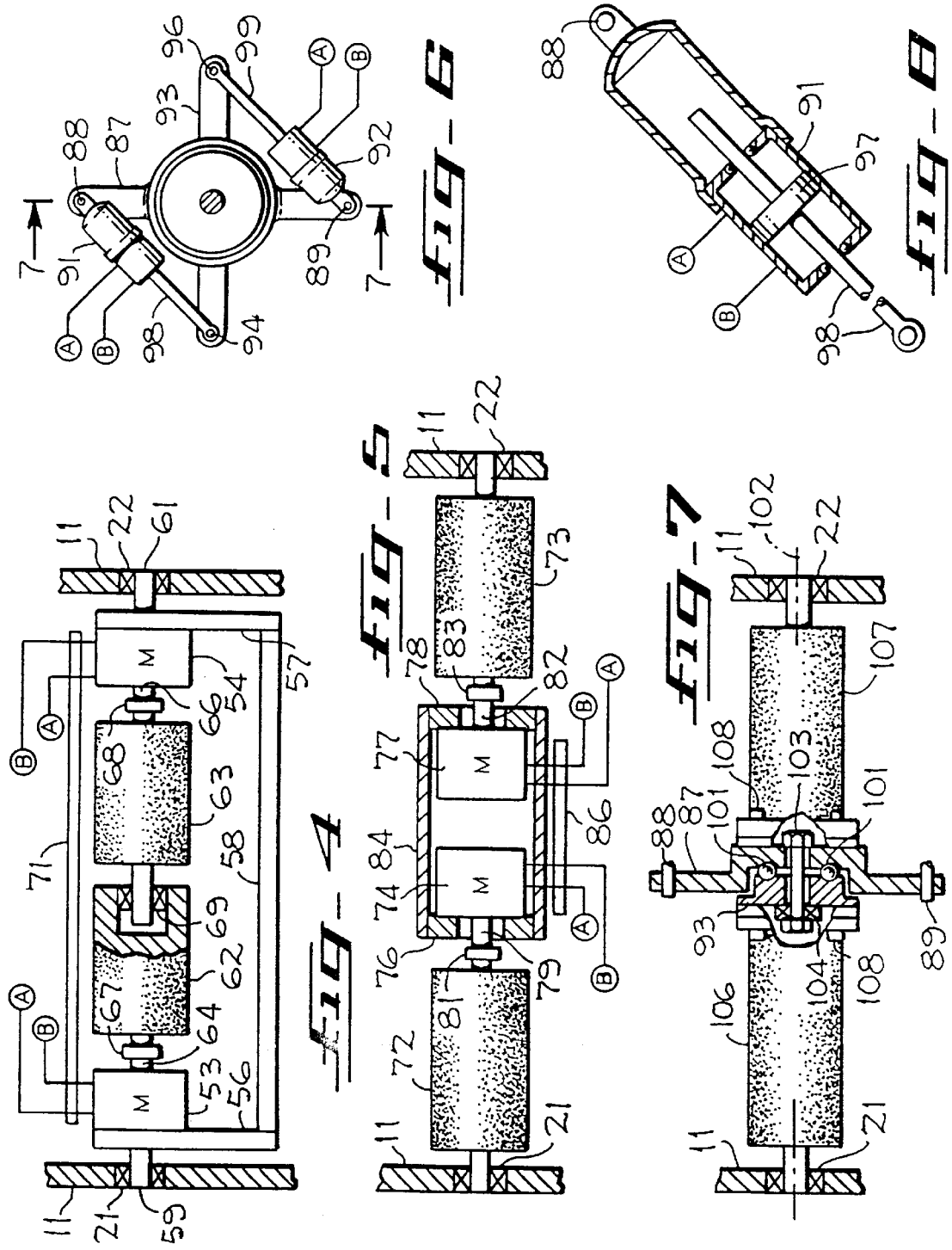

DIRECT DRIVE VIBRATORY SHAKER

This application is a continuation of Ser. No. 09/929,630 filed Aug. 13, 2001 now U.S. Pat. No. 6,405,516, and is a continuation of Ser. No. 09/414,997 filed Oct. 7, 1999 now abandoned.

SUMMARY OF THE INVENTION

A directly driven shaker is disclosed herein for mounting on a mobile crop harvester framework used for harvesting bush, tree and vine grown crops. A crop foliage engaging brush has a brush axis of rotation. A drive motor is connected to the crop foliage engaging brush for providing a motor output that directly drives the crop foliage engaging brush about the brush axis of rotation. Means is provided for journalling the crop foliage engaging brush and the drive motor on the mobile crop harvester framework. A power source is provided on the mobile crop harvester framework, which produces a power output connected to the drive motor. Means is mounted between the power source and the motor for controlling the power output connected to the drive motor.

A direct drive shaker head is disclosed that is mounted for rotation on a framework of a mobile crop harvester used for harvesting above ground grown crops. A crop engaging brush has an axial length and an axis of rotation. A motor is provided which produces a motor output connected to directly drive the crop engaging brush about the axis of rotation. Means is connected to the motor for controlling the motor output to provide oscillatory motion of the crop engaging brush about the axis of rotation.

A crop harvester is disclosed for separating a crop from plants growing from an underlying surface. The crop harvester includes a harvester framework and harvester propulsion means that is mounted in the harvester framework. Means is attached to the harvester framework and connected to the harvester propulsion means for engaging the underlying surface for supporting the harvester framework and for producing harvester movement over the underlying surface. A crop foliage engaging brush has a brush axis of rotation and an axial length. A brush drive motor provides a motor output, which is connected directly to and drives the crop foliage engaging brush about the brush axis of rotation. Further, means is provided for journalling the crop foliage engaging brush and the brush drive motor on the harvester framework. A power source is present for providing power to the brush drive motor. Control means is mounted between and connected to the power source and the brush drive motor for controlling the motor output to provide oscillatory motion of the crop foliage engaging brush about the brush axis of rotation.

The invention relates to a shaker for harvesting crops from plants wherein the shaker is configured to be mounted on a framework of a crop harvester. A harvesting brush is provided for contacting the plants, the brush having a brush axis. A brush drive motor is connected to drive the brush about the brush axis. The drive motor has a motor shaft and a motor case. Means is present for providing a predetermined ratio of inertia about the brush axis between the motor shaft and the motor case. Further, means is present for supporting the combination of the harvesting brush, the brush drive motor and the means for providing a predetermined ratio on the framework for rotation about the brush axis.

BRIEF DESCRIPTION OF THE DRAWINGS

FIG. 1 is a mechanical diagram of one embodiment of the present invention.

FIG. 2 is a block diagram generally depicting the power source, power distribution and distribution control utilized in the present invention.

FIG. 3 is a mechanical diagram of another embodiment of the present invention.

FIG. 3A is a view along the line 3A—3A of FIG. 3.

FIG. 4 is a mechanical diagram of yet another embodiment of the present invention.

FIG. 5 is a mechanical diagram of still another embodiment of the present invention.

FIG. 6 shows an additional embodiment of the present invention.

FIG. 7 is a partial section along the lines 7—7 of FIG. 6.

FIG. 8 is a section of a piston motor used in the embodiment of FIG. 6.

DESCRIPTION OF THE PREFERRED EMBODIMENTS

Currently, shakers that are used for harvesting vegetables and fruits, such as tomatoes, cucumbers, grapes, raisins, and olives use a brush element having brush tines that enter the foliage of the crop and are then driven in an oscillatory manner to disengage the crop from the vines or bushes. The oscillation of the brush, however, is obtained currently by using eccentric masses that are timed to rotate in such as fashion as to produce a rocking couple. A motor drives the eccentric masses. Devices producing the rocking couples are called force-balanced shaker heads and contain two or more heavy eccentric masses. The oscillatory output from the force-balanced shaker heads is connected directly to the brush, which causes the tines engaging the crop foliage to oscillate. As may be imagined, the force-balanced shaker heads are heavy, due to the large eccentric masses, often weighing four to six hundred pounds. The brush and force-balanced shaker head together with a motor for driving the shaker head are often required to be raised or lowered as well as to be moved from side to side to accommodate contact with the crop foliage. When the motor, shaker head and brush assembly are positioned high on or laterally of the harvesting machine, the center of gravity of the harvesting machine can assume a position which causes instability in the harvesting machine as it travels over an underlying surface. Additionally, in such force-balance shaker head driven harvesting machines it is not easy to adjust shaker displacement. To do so the harvesting operation must be stopped and the mass of the eccentric weights must be altered by adding or removing mechanical components from the eccentric masses. Many configurations of force-balanced shaker heads are known, clear descriptions of which may be found in U.S. Pat. No. 4,341,062, Scudder, and U.S. Pat. No. 4,432,190, Orlando.

In the invention to be described herein, the force-balanced shaker head is eliminated as well as a net rotation retarder or rotation brake. Three to four hundred pounds of weight are eliminated by elimination of the eccentric masses. The reduction in weight further reduces the potential for harvesting machine instability due to high or laterally shifted centers of gravity when the shaker head is elevated or extended to contact foliage in an olive tree, for example. Axial length of a shaker head previously occupied by an eccentric mass assembly and a drive motor therefor is eliminated and the entire length of the novel shaker head described herein is the axial length of the brush as the direct drive motor may be placed internally within the brush. Further, the frequency of oscillation of the brush and the amplitude of oscillation can be independently controlled by controlling the output of the direct drive motor. In addition, the form of the oscillation wave is also readily modified by controlling the output of the direct drive motor for the brush.

A brief review of some equations of motion for a harvesting brush will be undertaken. For simplification purposes, a simple harmonic sine/cosine motion will be used in the analysis. Typically, a harvesting brush is constructed of a series of rings having an inside diameter, wherein a number of shaker tines are mounted in each ring, the tines extending outwardly around the entire periphery of the ring. A plurality of rings are mounted side by side to form a cylinder having an inside diameter. A plurality of radially extending tines project from the cylinder. The inside diameter of the cylinder formed by the plurality of rings is left free of other structure to accept a direct drive motor as will be hereinafter explained.

A typical dimension for tine extension from the center of the cylinder or axis of rotation of the harvesting brush is approximately 27 inches. A typical oscillatory amplitude at the tip of the tines ±4 inches. The angular displacement of the tips of the tines in radians then computes to 0.149 radians. In terms of a hydraulic motor, for purposes of this explanation, a motor size which exhibits $2\pi$ radians of shaft rotation for 24 cubic inches of hydraulic flow is selected. With such a motor size for the desired tine tip amplitude of ±4 inches, a hydraulic flow of 0.57 cubic inches is required. It remains to find a maximum flow rate for the hydraulic motor in cubic inches per second for a selected maximum operating frequency, $\omega$. The equations of motion, where G is flow displacement in cubic inches and Q is flow rate, $G=A\cos(\omega t)$ and $Q=-A\omega\sin(\omega t)$. Since the negative sign in the expression for Q merely keeps track of phase angle between displacement and velocity it is of no interest and is dropped resulting in the expression $Q=A\omega\sin(\omega t)$ cubic inches per second. For displacement A of 0.57 cubic inches and an operating frequency $\omega$ of 400 cycles per minute, Qmax [when $\sin(\omega t)=1$] computes to 6.2 gallons per minute. It may be seen in a hydraulic system conforming to this example that the displacement of the tine tips A on the shaker brush may be adjusted, hydraulic fluid flow rate Q through the hydraulic motor may be adjusted, and the frequency of oscillation $\omega$ of the harvester brush may be adjusted. Components chosen for the hydraulic system to function as hereinbefore described include a hydraulic valve (Parker D1FHE50MCNBJ00), hydraulic motor (Parker NE0395-BS-03-0-AAAB), and valve controller (Parker PMC-10E). It is envisioned that the foregoing hydraulic components could be replaced by appropriate pneumatic components or appropriate electrical components to obtain control of the characteristics of a shaker brush similar to those recited herein for the hydraulic system.

With reference now to FIG. 1, a system constructed in conformance with the foregoing analysis is pictured. A crop harvester 10 is shown in FIG. 1 having a framework 11 on which is mounted a harvester propulsion unit 12. Harvester 10 is supported on an underlying surface 13 by a plurality of wheels 14. The wheels 14 are connected to and driven by the propulsion unit 12 so that the harvester 10 is moveable over the underlying surface. A split crop harvesting brush having a left harvesting brush half 16 and a right harvesting half 17 is shown in FIG. 1, wherein an axial shaft 18 is shown on brush 16 and an axial shaft 19 is shown on brush 17. One end of the axial shaft 18 is journalled in the frame 11 by means of a bearing 21. One end of axial shaft 19 is also journalled in the framework 11 by means of a bearing 22. The brushes are therefore free to rotate in the framework about substantially co-linear axes. A hydraulic motor 23 is shown situated between the left and right brush halves 16 and 17 having a motor case 23a and a motor output shaft 23b. A coupling 24 is shown fixing the output shaft 23b to an opposing end of the left brush half shaft 18. Another coupling 26 is shown coupling the motor case 23a to an opposing end of the right brush half axial shaft 19. The motor 23 is shown in FIG. 1 externally of the brush halves 16 and 17, whereas the brush halves in practice could be moved together and the motor 23 placed within the aforementioned inner diameter within the brush halves formed by the side by side rings which hold the radially outward extending tines, as previously described herein.

FIG. 1 further includes a hydraulic power source 27 shown in dashed lines, a hydraulic fluid reservoir 28 and a hydraulic pump 29. As shown, hydraulic flow is directed to a valve 31 and return flow is conducted from the valve to the fluid reservoir. Valve controller 32 is connected to the valve 31 that operates to control the fluid flow from the valve 31 to the hydraulic motor 23. Valve controller 32 provides for operator adjustable parameters for the valve 31 so that aspects of the hydraulic motor 23 are controllable thereby. An operator controllable speed or frequency input 33, displacement or amplitude input 34 and time rate of change of amplitude or wave shape 36 are provided. In this fashion, the frequency of the oscillation brush halves 16 and 17, the amplitude of the oscillation and the shape of the amplitude as a function of time are controllable by an operator of the harvesting machine. Power transfer device or swivel 37 is shown situated between the valve 31 and the hydraulic motor 23 to transfer power between the valve and the hydraulic motor while accommodating rotation of the hydraulic motor relative to the frame mounted valve 31. FIG. 1 therefore depicts schematically a crop harvester which has a harvester brush assembly driven directly by a motor, wherein the motor output shaft characteristics, i.e., frequency, displacement and wave shape, are controllable by an operator "on-the-fly" as the harvesting machine travels along the underlying surface 13 accomplishing its harvesting mission.

It should be noted that neither the shaft 23b nor the motor case 23a is fixed rotationally. The combined inertia about the brush axis of the motor case 23a and the brush 17 fixed to the motor case will likely be substantially the same as the combined inertia of the shaft 23b and the brush 16 fixed to the shaft. This results when the brush inertias are similar because they are considerably larger than the shaft and motor case inertias. In this instance, when the motor 23 is powered by hydraulic flow, the shaft will rotate through an angle in one direction and the motor case, in reaction, will rotate through a similar angle in an opposing direction. In an instance where it is desirable to have unequal angles of departure (oscillation) from an at rest position in the brush, a predetermined ratio of inertias is imposed between the shaft and motor case loads. The larger inertial element, whether it is on the shaft or the case, will dictate a smaller angle of departure from the neutral or at rest position than the smaller inertial element. This invention envisions control of the relative angles of oscillation from neutral for the brush or brushes through predetermination of the inertial loads carried by the motor shaft and the motor case.

As seen in FIG. 2, a block diagram of a power source 38 connected to a power distribution device 39 is shown. A control 41 is connected to the power distribution device and output from the power distribution device is shown at A and B in FIG. 2. FIG. 2 shows a general combination of power source, power distribution and controller, whereas FIG. 1 is hydraulic specific. Power source 27, valve 31 and valve controller 32 of FIG. 1 correspond to power source 38, power distribution device 39 and control 41 of FIG. 2 respectively. Power source 38 could be pneumatic or electrical in FIG. 2 and power distribution element 39 could be a pneumatic valve or an electrical distribution circuit, respectively. Controller 41 would then take the form of a controller for the pneumatic valve or a controller for the electrical distribution circuit, whichever appropriate. The controller 41 in a hydraulically powered embodiment of the invention dictates flow quantity, flow direction or sense and the time rate of change of the flow quantity or cyclic wave shape. In the instance where the power source 38 is a pneumatic source, the motor 23 of FIG. 1 would then be a pneumatically driven motor. In the event where the power source 38 is an electrical power source, the motor 23 of FIG. 1 would take the form of an electrical motor. The arrangement of FIG. 2 is intended to show power distribution and distribution control without regard for the character of the power source. Any power source and power distribution control system falling within this category is useful in the embodiment of FIG. 1 or in any of the embodiments to be hereinafter described. In the following embodiment descriptions the power source and power distribution control is represented by the input A and B with an appropriate direct drive motor responsive to the power source elected whether it be hydraulic, pneumatic, electrical, or otherwise. It should be noted again that with the power source and power distribution control of FIG. 2 there is no need to halt harvesting operations to change harvesting brush characteristics as is the case when changing harvester brush characteristics in other currently known harvesting machines.

With regard to FIG. 3, the framework 11 is shown having bearings 21 and 22 mounted therein for supporting (or, as used herein, journalling) opposing ends of a brush and a direct drive motor assembly. The harvester brush 42 has one end supported in the bearing 21 and an opposing end joined by a coupler 43 to an output shaft 44 on a motor 46. An extension 47 of the case of the motor 46 is supported in the bearing 22. The motor 46 is actuated by distributed power at the points A and B obtained as previously explained in conjunction with the description of the diagram of FIG. 2. An inertial member 48 is fixed to the case of the motor 46, serving as a reaction force to rotation of the motor output shaft 44. Inertial member 48 is shown in section in FIG. 3 for clarity. A connection point 49 is formed on the inertial member 48, serving as an anchor for a pair of coil springs 51 and 52 as seen in FIG. 3A. Opposing ends of the springs 51 and 52 are attached to points on the frame 11 as shown. Coil springs 51 and 52 shown in FIG. 3A operate as centering springs and could as readily be leaf springs, etc. The centering springs allow the case of motor 46 to oscillate in response to the motion of the output shaft 44, but not to rotate. The oscillation amplitude of the motor case 46 is designed to be significantly less than the oscillation amplitude of the motor shaft 44 and brush 42 combination by appropriate selection of inertial member 48. Therefore, in the embodiment of FIG. 3 no swivel is necessary for transferring the distributed power to the motor 46. Flexible hoses accomplish the transfer because the motor 46 does not continuously rotate relative to the framework 11.

FIG. 4 shows the framework 11 and the bearings 21 and 22 functioning to support opposing ends of the shaker brush and drive motor assembly of FIG. 4. The embodiment of FIG. 4 shows a left motor 53 and a right motor 54. The left motor 53 has its case mounted on a plate 56 and right motor 54 has its case mounted on a plate 57. A connecting member or torsion member 58 is shown connected between the plates 56 and 57. The connecting member 58 prevents the cases of motors 53 and 54 from rotating relative to one another. An extension 59 from the case of motor 53 is supported within the bearing 21. An extension 61 of the case of motor 54 is supported within the bearing 22. A left crop foliage engaging brush 62 is shown together with a right crop foliage engaging brush 63. Left motor 53 has an output shaft 64 and right motor 54 has an output shaft 66. A coupling 67 connects output shaft 64 to one end of crop foliage engaging brush 62 and another coupling 68 connects output shaft 66 to one end of right crop foliage engaging brush 63. The opposing ends of the left and right crop foliage engaging brushes 62 and 63 are connected in rotating relationship by a bearing 69 as seen in FIG. 4. The motors 53 and 54 are connected to the points A and B at the output of the controlled and distributed power system of FIG. 2 so that the output shafts 64 and 66 will rotate in opposite directions about the shaft axis. The torques at the cases of the motors 53 and 54 will cancel through the connecting member 58. The connecting or torsion member 58 is shown in FIG. 4 as passing outside the diameter of the brush tines for clarity only. It could as well pass along the inside diameter passage inside the tine holding rings as discussed in the description of the harvesting brush structure hereinbefore. In the event the embodiment of FIG. 4 is caused to rotate relative to the framework 11, a power transfer device or swivel 71 is used to accommodate rotation between the cases of motors 53 and 54 and the framework 11 of the crop harvester 10.

Yet another embodiment of the present invention is seen in FIG. 5 wherein the harvester framework 11 has bearings 21 and 22 mounted therein for supporting one end of a left harvester brush assembly 72 and one end of a right harvester brush 73. Left direct drive motor 74 is mounted to a plate 76 and a right direct drive motor 77 is mounted to a plate 78. Left direct drive motor 74 has an output shaft 79 which is connected by a coupling 81 to an opposing end of the left harvester brush 72. Right direct drive motor 77 has an output shaft 82 which is connected by means of a coupling 83 to an opposing end of the right harvester brush 73. A connecting member 84 is joined to the peripheral regions of both plates 76 and 78. The connecting member 84 may take the form of a tube enclosing the motor cases. In this fashion the cases of the direct drive motors 74 and 77 are prevented from rotating relative to each other. Direct drive motors 74 and 77 are connected to the controlled and distributed power outputs A and B in such a fashion as to cause rotation of their respective output shafts 79 and 82 in opposite directions about the axis of the assembly of FIG. 5. In most cases it will be preferred that the motors 74 and 77 are identical in characteristics, but unequal motors could also be used. Motors of dissimilar size will result in dissimilar torques at shafts 79 and 82. In the event that the embodiment of FIG. 5 is configured to rotate about the axis of the harvester brushes 72 and 73 as it passes through the foliage of a crop being harvested, a device for transferring power from the framework 11 to the direct drive motors 74 and 77 such as swivel 86 will be required. Conversely, if it is not necessary to allow the harvester brushes 72 and 73 to rotate through the plant foliage, no swivel 86 is required.

Turning now to FIG. 6 of the drawings, an embodiment using piston motors is displayed. The embodiment is disclosed in conjunction with hydraulically driven piston motors. A first lever corresponding to some degree to the connecting members 58 and 84 in FIGS. 4 and 5, respectively, is shown as item 87. Lever 87, vertically disposed in FIG. 6, has an upper pivot point 88 and a lower pivot point 89. An upper cylinder 91 is pivotally attached at pivot point 88 and a lower cylinder 92 is pivotally attached at lower pivot point 89. An additional lever 93, horizontally disposed in the depiction of FIG. 6, has a left pivot point 94 thereon and a right pivot point 96. Cylinder 91 has a piston 97 contained therein (FIG. 8) to which is attached a piston rod 98 extending outwardly therefrom through a sealed aperture. The piston motor shown in FIG. 8 has equal piston area on opposing sides of the piston so that similar flow into either cylinder chamber provides similar force in opposing directions along the piston rod 98. A free end of the piston rod 98 is pivotally attached at the pivot point 94. Cylinder 92 contains a piston similar to piston 97, having a piston rod 99 extending therefrom through a sealed aperture. Free end of piston rod 99 is pivotally attached at pivot point 96 on the lever 93. FIG. 7 is a partial section taken from FIG. 6 showing the levers 87 and 93 positioned with a thrust bearing 101 therebetween so that they may freely rotate relative to one another about an axis 102. A fastening member 103 extends along the axis 102 between the levers 87 and 93 having a bearing 104 at one end thereof to preserve independent rotation between the levers. A left harvesting brush 106 and a right harvesting brush 107 are shown in FIG. 7 connected by fastening means 108 to the lever 93 and the lever 87, respectively. Opposing ends of brush 106 and 107 are supported in the harvester framework 11 by bearings 21 and 22, respectively. As in the other embodiments disclosed herein having more than one actuator or motor directly connected to the harvester brushes, power to points A and B in FIG. 6 from the controlled and distributed power at points A and B of FIG. 2 is simultaneously delivered to points A or B at the piston motors of the embodiment of FIG. 6. Also, as in the previously described embodiments of this invention, if it is desirable for the harvester brushes 106 and 107 to rotate through the foliage of the crop being harvested, a power transfer device (i.e., hydraulic swivel, electrical slip rings, etc.) must be positioned between the framework 11 and cylinders 91 to and 92 in the direct drive piston motors of FIG. 6.

Although the best mode contemplated for carrying out the present invention has been shown and described herein, it will be understood that modification and variation may be made without departing from what is regarded to be the subject matter of the invention.

What is claimed:

1. A direct drive shaker head mounted for oscillatory rotating motion on a framework of mobile crop harvester used for harvesting above ground crops, comprising
   a first crop engaging brush having and axial length and an axis of rotation,
   a first motor mounted to a first plate, said first motor providing a motor output directly connected to said first crop engaging brush to directly drive said first crop engaging brush about said axis of rotation,
   a second crop engaging brush having an axial length and an axis of rotation,
   a second motor mounted to a second plate, said second motor providing a motor output directly connected to said second crop engaging brush to directly drive said second crop engaging brush about said axis of rotation,
   a connecting member connecting said first plate to said second plate, said connecting member preventing the first motor and the second motor from rotating relative to one another,
   a device for transferring power from the framework of the mobile crop harvester to the first and second motors,
   and a controller controlling output from said first motor and from said second motor to provide oscillatory motion of said first crop engaging brush and said second crop engaging brush respectively about said axis of rotation of each crop engaging brush.

2. The direct drive shaker head of claim 1 wherein one or more of said motors comprises a hydraulic motor.

3. The direct drive shaker head of claim 1 wherein one or more of said motors comprises a pneumatic motor.

4. The direct drive shaker head of claim 1 wherein one or more of said motors comprises an electric motor.

5. The direct drive shaker head of claim 1, wherein said first and said second crop engaging brushes each comprises:
   a hub having an internal chamber and radially outward extending tines, said motor being positioned within said internal chamber.

6. The invention in accordance with claim 1 wherein said device for transferring power from the framework to the motors is a swivel.

7. The invention in accordance with claim 1 wherein said connecting member is a tube encasing the first and second motor case.

* * * * *